(12) United States Patent
Wang et al.

(10) Patent No.: US 11,507,240 B2
(45) Date of Patent: *Nov. 22, 2022

(54) TOUCH SENSOR

(71) Applicant: HIGGSTEC INC., Taoyuan (TW)

(72) Inventors: Yi-Han Wang, Taoyuan (TW);
Tzu-Chien Lin, Taoyuan (TW);
Chui-Xiang Chiou, Taoyuan (TW);
Hung-Yu Tsai, Taoyuan (TW)

(73) Assignee: HIGGSTEC INC., Taoyuan (TW)

( * ) Notice: Subject to any disclaimer, the term of this patent is extended or adjusted under 35 U.S.C. 154(b) by 23 days.

This patent is subject to a terminal disclaimer.

(21) Appl. No.: 16/853,257

(22) Filed: Apr. 20, 2020

(65) Prior Publication Data

US 2021/0326006 A1 Oct. 21, 2021

(51) Int. Cl.
*G06F 3/044* (2006.01)

(52) U.S. Cl.
CPC .......... *G06F 3/0448* (2019.05); *G06F 3/0446* (2019.05)

(58) Field of Classification Search
CPC ..... G06F 3/0448; G06F 3/0446; G06F 3/0414
See application file for complete search history.

(56) References Cited

U.S. PATENT DOCUMENTS

| | | | |
|---|---|---|---|
| 10,296,047 B2 | 5/2019 | Kallman et al. | |
| 11,150,107 B1 * | 10/2021 | Wang | G01D 5/14 |
| 2013/0147740 A1 * | 6/2013 | Wang | G06F 3/0443 |
| | | | 345/173 |
| 2015/0212622 A1 * | 7/2015 | Hirata | G06F 3/0445 |
| | | | 345/174 |
| 2016/0216789 A1 * | 7/2016 | Chang | G06F 3/041 |
| 2016/0266705 A1 * | 9/2016 | Chang | G06F 3/005 |
| 2016/0334919 A1 * | 11/2016 | Zhu | G06F 3/044 |

FOREIGN PATENT DOCUMENTS

| | | |
|---|---|---|
| CN | 107562235 A | 1/2018 |
| CN | 108255296 A | 7/2018 |

* cited by examiner

*Primary Examiner* — Amit Chatly
(74) *Attorney, Agent, or Firm* — Muncy, Geissler, Olds & Lowe, P.C.

(57) ABSTRACT

A touch sensor comprises a first electrode, a second electrode arranged spaced apart from the first electrode, and an insulator arranged between the first electrode and the second electrode, wherein at least one of the first electrode and the second electrode is energized, and an energy difference exists between the first electrode and the second electrode. At least one of the first electrode and the second electrode is a stressed electrode. When the stressed electrode is not stressed, no electrical signal is generated, and when the stressed electrode is stressed, the stressed electrode deforms at a stressed point and changes the distance between the stressed point and the other electrode to generate a tunneling current, and the touch sensor generates the electrical signal according to whether the tunneling current is generated. Therefore, the invention solves a limitation of the conventional touch sensor in touching and provides good touching sensitivity.

10 Claims, 11 Drawing Sheets

TOUCH SENSOR

FIELD OF THE INVENTION

The invention relates to a touch sensor, in particular to a touch sensor for detecting a touch through tunneling current generated by distance change between electrodes.

BACKGROUND OF THE INVENTION

At present, the touch control devices on the market use the principles of capacitance, resistance, piezoelectric and the like to control. In the case of the capacitive touch device, the touch device must be operated by a conductor during touch operation, and the capacitive touch device cannot be operated when the touch body is not a conductor. For example, although a finger can be used as the touch body, the capacitive touch device cannot be controlled when a glove is worn on the hand of a user. In addition, in the case of the resistive touch device, the resistive touch device is mainly formed by conductive lamination of an upper group of ITO and a lower group of ITO, when the resistive touch device is used, the upper electrode and the lower electrode are contacted and conducted through pressure, and the position of the contact point is calculated by sensing the voltage change of the panel through an internal controller. Besides, the resistance type touch device is a kind of contact touch device, and the contact touch device tends to have the problems of accuracy and sensitivity, for example, the precision is relatively poor when the resistance type touch device is used for drawing. Also, the resistance type touch control devices are mostly single-point touch control, and although the multi-point touch control devices exist currently, the resolution of the devices is poor. Moreover, although the defects of the capacitive touch panel and the resistive touch panel can be improved by a composition touch panel, which is combined by the capacitive touch and the resistive touch, the thickness of the touch panel cannot be lightened and thinned. On the other hand, the piezoelectric touch device takes a piezoelectric material as a basic structure of a panel. The signal control of the piezoelectric material is unstable, and the problems of operation accuracy, sensitivity and the like are easy to occur. Yet most current piezoelectric materials are not optical grade materials and are not suitable for use on touch panels.

Further, the patents CN 107562235A, CN 108255296A and U.S. Ser. No. 10/296,047B provide the touch control devices which do not conduct the upper electrode and the lower electrode by the above-mentioned principle. As mentioned in the disclosure of the foregoing patent, they mainly uses a plurality of conductive particles arranged between the upper electrode and the lower electrode, and the upper electrode and the lower electrode are conducted by shortening the distance between the conductive particles. However, in these conventional methods, the stressed position of the touch device cannot be accurately detected, so that the touch device still has the problems of insufficient operation accuracy or sensitivity and the like.

SUMMARY OF THE INVENTION

The main object of the invention is to solve the problems of the conventional touch control device that the touch control is limited and the resolution is insufficient.

To achieve the above object, the invention provides a touch sensor including a first electrode; a second electrode spaced apart from the first electrode, wherein at least one of the first electrode and the second electrode is energized, and an energy difference is existed between the first electrode and the second electrode; and an insulator arranged between the first electrode and the second electrode; wherein at least one of the first electrode and the second electrode is a stressed electrode, when the stressed electrode is not stressed, no electrical signal is generated by the touch sensor; when the stressed electrode is stressed to deform at a stressed point, a distance between the stressed point and the other electrode is changed, and the stressed electrode is not in contact with the other electrode; and when the distance between the first electrode and the second electrode is shortened to an energy transmission distance, the electrical signal is generated by the touch sensor.

In one embodiment, the insulator is a gas or a tangible object.

In one embodiment, the insulator is a gas, the touch sensor comprises a spacer arranged between the first electrode and the second electrode, and at least one gas hole for accommodating the gas is arranged on the spacer.

In one embodiment, the touch sensor comprises a first substrate disposed on a side of the first electrode opposite to the insulator and a second substrate disposed on a side of the second electrode opposite to the insulator.

In one embodiment, the first electrode and the second electrode are respectively provided with a plurality of conductive lines in high density.

In one embodiment, the first electrode comprises a plurality of first sub-electrodes which share the same first substrate, and the second electrode comprises a plurality of second sub-electrodes which share the same second substrate.

In one embodiment, the first substrate comprises a plurality of first sub-substrates which share the same first electrode, and the second substrate comprises a plurality of second sub-substrates which share the same second electrode.

In one embodiment, the first substrate comprises a plurality of first sub-substrates arranged in parallel and spaced apart, and the second substrate comprises a plurality of second sub-substrates arranged in parallel and spaced apart, each of the plurality of first sub-substrates has a first extending direction, and each of the plurality of second sub-substrates has a second extending direction perpendicular to the first extending direction.

According to the aforesaid features, the invention has the following characteristics compared with the conventional technique. A touch controller of the touch sensor provided by the invention is not limited to be a conductor or a non-conductor, and the tunneling current is generated only in a condition that a certain distance is achieved. Also, the magnitude of the tunneling current is more related to the force applied by the touch controller, so that the touch sensor is able to perform more specific touch identification. Furthermore, the operation accuracy and sensitivity of the touch sensor of the invention are better than those of a touch sensor which is conventionally implemented by a resistor structure or a capacitor structure.

DETAILED DESCRIPTION OF THE PREFERRED EMBODIMENTS

Figure 1:
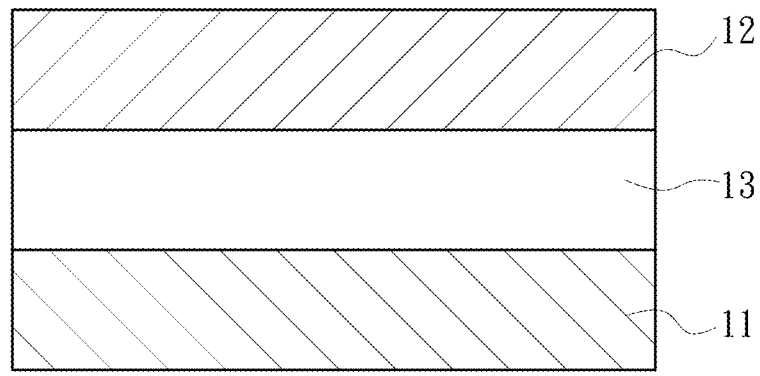
FIG. 1 is a structural schematic diagram of a first embodiment of the invention.
Figure 2:
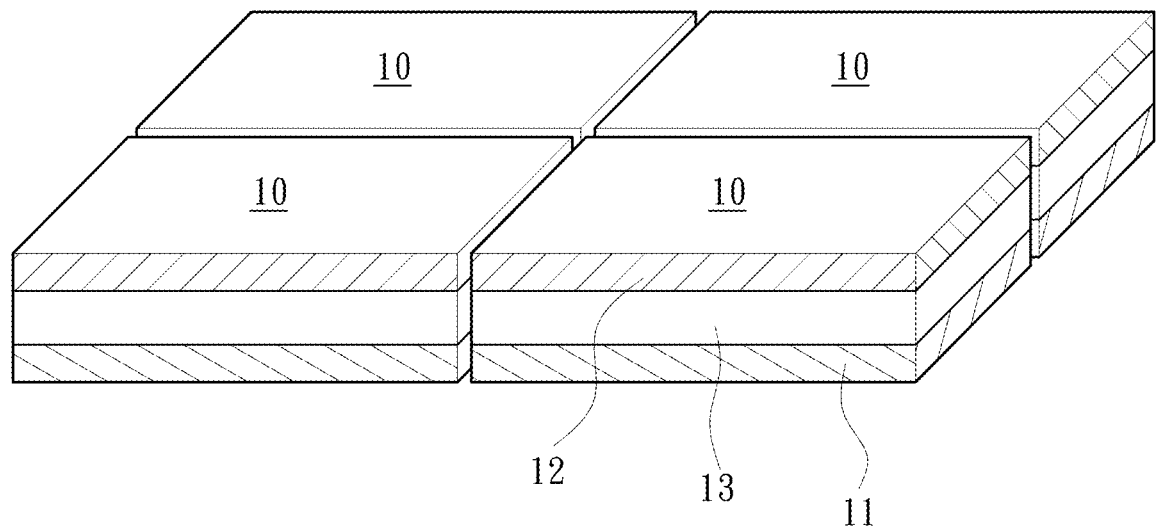
FIG. 2 is a structural schematic diagram of a plurality of arrangements of a first embodiment of the invention.
Figure 3:
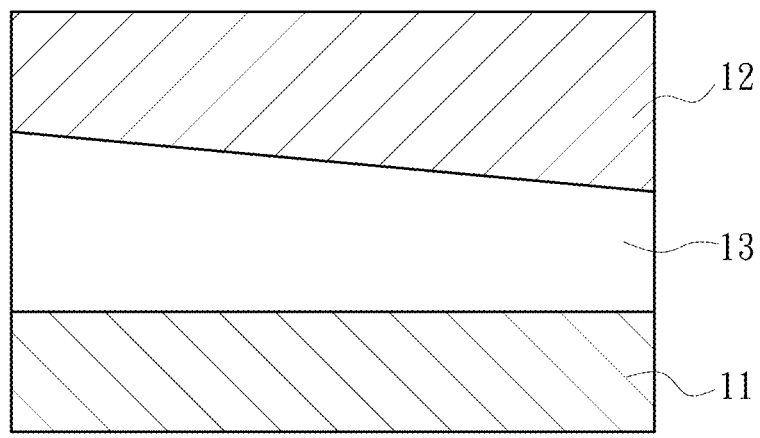
FIG. 3 is another structural schematic diagram of the first embodiment of the invention.

The detailed description and technical contents of the invention will now be described with reference to the drawings as follows:

Referring to FIG. 1, FIG. 2, and FIG. 3, the invention provides a touch sensor 10, which can be applied to products of display-related industries such as mobile phones, flat panels, industrial computers and the like, and can form a product panel in a single number or be implemented in a plurality of touch sensors 10 in practical applications. Further, a plurality of the touch sensors 10 are arranged spaced apart, and are arranged in a regular or irregular manner, and the drawings are not intended to limit the invention. In addition, when the touch sensors 10 are implemented by plural, a touch module is formed, and the touch sensors 10 are arranged at appropriate intervals as described. Each touch sensor 10 is respectively defined with position information, so that when the touch module is implemented, the position where the touch is generated can be known on the basis of the position information.

The touch sensor 10 comprises a first electrode 11, a second electrode 12 and an insulator 13, wherein the first electrode 11 and the second electrode 12 have conductive properties. For example, the first electrode 11 and the second electrode 12 are respectively a material containing silver nanowires (AgNW), a material containing indium tin oxide (ITO), a copper material or a silver material and the like. In one embodiment, the resistivity of both the first electrode 11 and the second electrode 12 is less than $10^2$ ohm-meter. Further, the first electrode 11 and the second electrode 12 are spaced apart, and the first electrode 11 and the second electrode 12 are arranged horizontally or non-horizontally with respect to each other, as shown in FIG. 1 and FIG. 3. Further, whether the first electrode 11 and the second electrode 12 of the invention are provided in any of the above-mentioned manners, the first electrode 11 and the second electrode 12 are not in contact with each other. In order to describe the implementation of the first electrode 11 and the second electrode 12 conveniently, a horizontal arrangement between the first electrode 11 and the second electrode 12 will be exemplified as follow. In one embodiment, at least one of the first electrode 11 and the second electrode 12 is energized, for example, the first electrode 11 is not additionally energized, and the second electrode 12 is additionally energized, so that an energy difference exists between the first electrode 11 and the second electrode 12. That is, the first electrode 11 has a low potential and the second electrode 12 has a high potential. Conversely, in another embodiment, the second electrode 12 is designed to have a low potential, and the first electrode 11 is energized to have a high potential. Furthermore, in one embodiment, the first electrode 11 and the second electrode 12 are designed to be energized, but the energy of the first electrode 11 is different from the energy of the second electrode 12, so that there is also an energy difference between the first electrode 11 and the second electrode 12. Further, the energy difference between the first electrode 11 and the second electrode 12 is not sufficient to cause electrons in the first electrode 11 or electrons in the second electrode 12 to form a current across the insulator 13. In other words, when the first electrode 11 and the second electrode 12 are unstressed, the touch sensor 10 is in a steady state without substantial energy transmission between the two electrodes.

In addition, the insulator 13 is arranged between the first electrode 11 and the second electrode 12, the resistivity of the insulator 13 is larger than that of the first electrode 11 and the second electrode 12, and the insulator 13 is implemented in a deformable and good elastic recovery tangible object such as silica gel, acryl force or an intangible object such as gas. In one embodiment, the insulator 13 is actually a substance which is not additionally doped with a conductive material. The resistivity of the insulator 13 remains unchanged when deformed under compression, and the resistivity of the tangible substance being greater than $10^2$ ohm-meter. Accordingly, when the insulator 13 is compressed, the insulator 13 is deformed to change the distance between the first electrode 11 and the second electrode 12, and when the insulator 13 is not compressed, the insulator 13 is restored, and the distance between the first electrode 11 and the second electrode 12 is restored to the original distance. In one embodiment, the insulator 13 has a thickness of about 0.01 nm to 500 μm.

Figure 4:
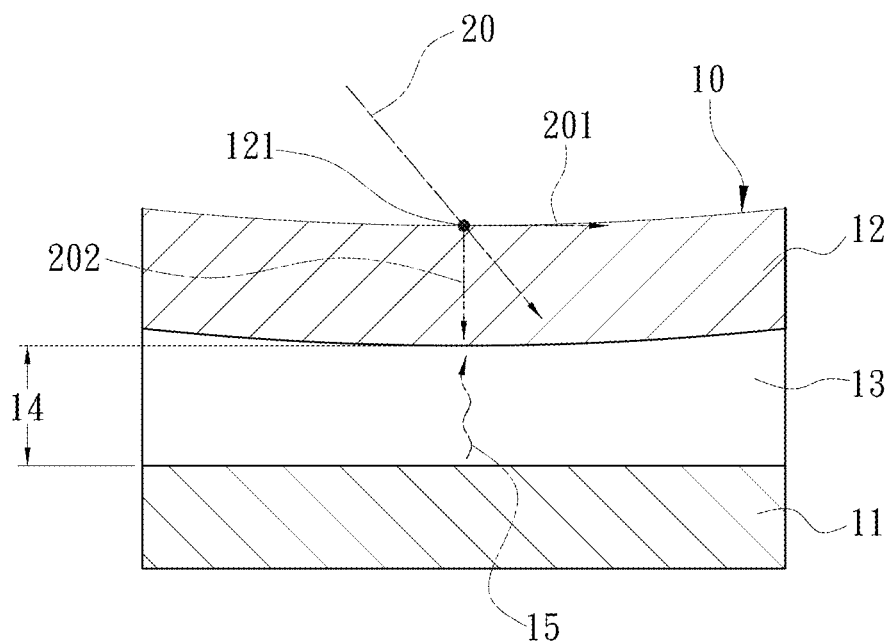
FIG. 4 is a status schematic diagram of the implementation of the first embodiment of the invention.

Further, at least one of the first electrode 11 and the second electrode 12 is a stressed when the touch sensor 10 is implemented. In order to describe conveniently, the second electrode 12 is assumed as the stressed electrode. When the second electrode 12 is not stressed, although there is an energy difference between the second electrode 12 and the first electrode 11, there is no energy transmission between the second electrode 12 and the first electrode 11, and the touch sensor 10 does not generate an electrical signal (not shown in the figures). After that, the second electrode 12 is deformed by an external force at a stressed point 121, and the distance between the stressed point 121 and the first electrode 11 is changed along with the application of the external force. Specifically, the stressed point 121 referred to herein is a stressed position of the second electrode 12 instead of a single point. Furthermore, in the invention, the force direction of the stressed electrode is not limited. Also, whether the touch sensor 10 generates energy transmission or not is determined by the change in the vertical distance between the first electrode 11 and the second electrode 12. For example, as shown in FIG. 4, an external force 20 experienced by the second electrode 12 is at a 45 degree angle with respect to the second electrode 12, wherein the external force 20 is resolved into a first component 201 at a 45 degree angle with respect to the external force 20 and parallel to the second electrode 12, and a second component 202 at a 45 degree angle with respect to the external force 20 and perpendicular to the second electrode 12. Furthermore, the second electrode 12 is subjected to the second component 202 to displace the stressed point 121 in a direction facing the first electrode 11, so that the distance between the stressed point 121 and the first electrode 11 is changed, but the second electrode 12 is not yet in contact with the first electrode 11. The second electrode 12 is continually subjected to the force to displace the stressed point 121 continually in a direction facing the first electrode 11. When the distance between the stressed point 121 and the first electrode 11 reaches an energy transmission distance 14, a tunneling current 15 is generated between the first electrode 11 and the second electrode 12, so that current flows between the first electrode 11 and the second electrode 12. Furthermore, the touch sensor 10 generates the electrical signal, and the touch sensor 10 enters a touched state. The tunneling current 15 is calculated as follows:

$$I \propto e^{-2kd},$$

where I is the tunneling current 15, k is the wave number, and d is the distance between the first electrode 11 and the second electrode 12.

As described above, the magnitude of the electrical signal is positively correlated with the magnitude of the force applied on the stressed electrode (i.e. the second electrode 12 as described above). That is, the larger the electrical signal, the larger the external force 20 applied on the second electrode 12, causing more electrons in the two electrodes being transferred to each other. Thus, the tunneling current 15 increases with touch control. Furthermore, the touch sensor 10 performs signal processing such as signal amplification, signal conversion and the like with respect to the electrical signal.

Figure 5:
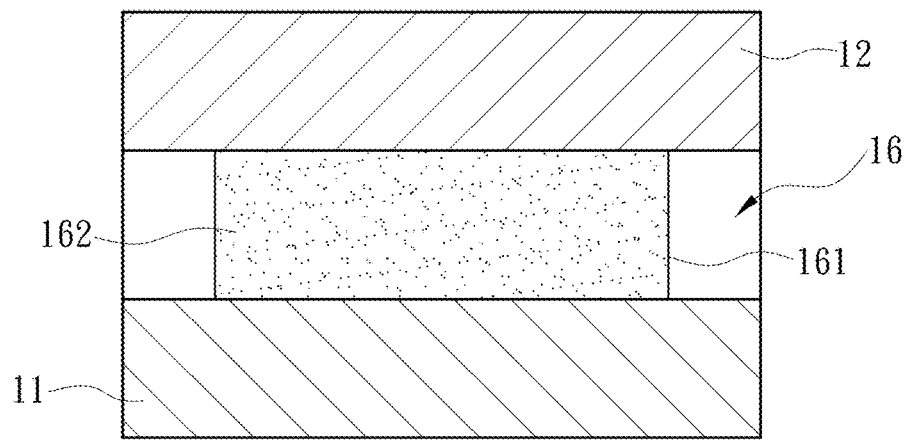
FIG. 5 is a structural schematic diagram of a second embodiment of the invention.
Figure 6:
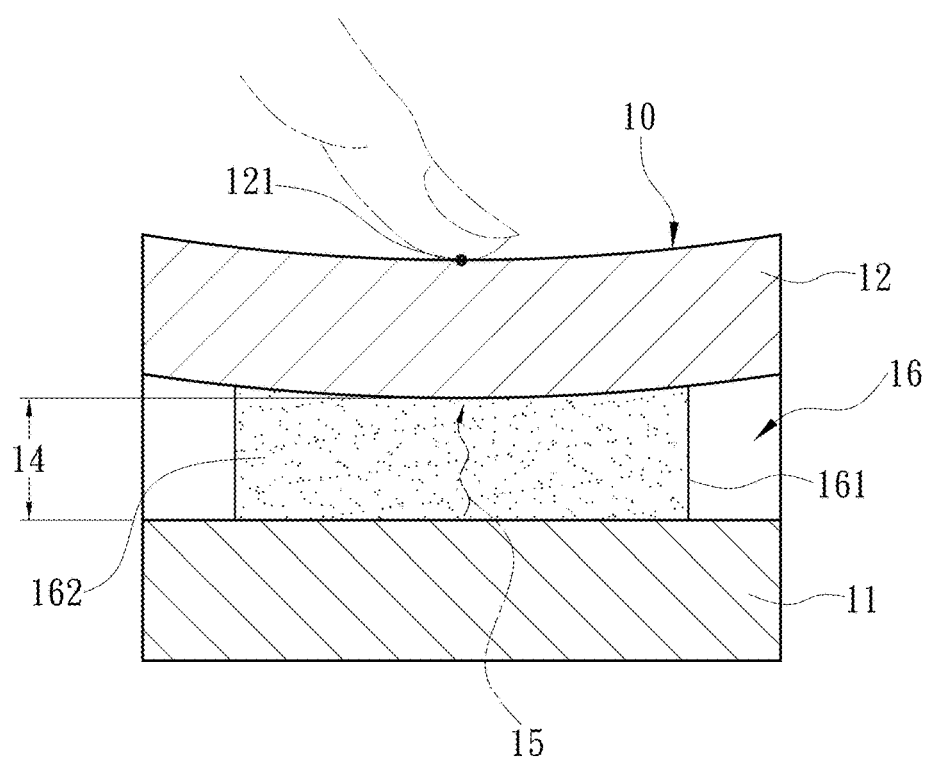
FIG. 6, is a status schematic diagram of the implementation of the second embodiment of the invention.

Please refer to FIG. 5 and FIG. 6. As mentioned above, the insulator 13 of the invention can also be implemented as an intangible object, exemplified by a gas hereinafter. In the embodiment, the resistivity of the gas is greater than the first electrode 11 and the second electrode 12, for example, the gas is an inert gas, a nitrogen gas or the like. In the embodiment, a hermetic space 161 is defined in the touch sensor 10. The hermetic space 161 is formed by the first electrode 11, the second electrode 12, and at least one spacer 16 sandwiched between the first electrode 11 and the second electrode 12. For example, the spacer 16 is implemented as a single sheet of material, and the spacer 16 is provided with at least one gas hole 162. When the spacer 16 is assembled with the first electrode 11 and the second electrode 12, two ends of the gas hole 162 are respectively shielded by the first electrode 11 and the second electrode 12 to be closed. Accordingly, the gas in the gas hole 162 is implemented as the insulator 13. Further, the gas holes 162 is formed by applying yellow light, laser light, printing, etching, etc. to the spacer 16. In addition, in one embodiment, the spacer 16 is implemented by plural, at least one hollowed area (not shown) is defined through the positions where the spacer 16 is placed, and the purpose of the hollowed area is the same as that of the gas hole 162, which is not described in detail herein. Accordingly, the stressed electrode (exemplified by the second electrode 12) is deformed by the external pressure, and the hermetic space 161 is reduced in volume by the external pressure while the second electrode 12 is deformed, so that the air pressure in the hermetic space 161 is increased. When the external force 20 is released, the second electrode 12 is restored by itself, and the volume of the hermetic space 161 returns to its original volume. In other embodiment, the gas is exemplified by a composition of air, and the electrical resistivity thereof is about $3 \times 10^{13}$ ohm-meter. Although the electrical resistivity of the gas is different due to the presence of water and temperature, the gas still has a large electrical resistivity with respect to the first electrode 11 and the second electrode 12.

Figure 7:
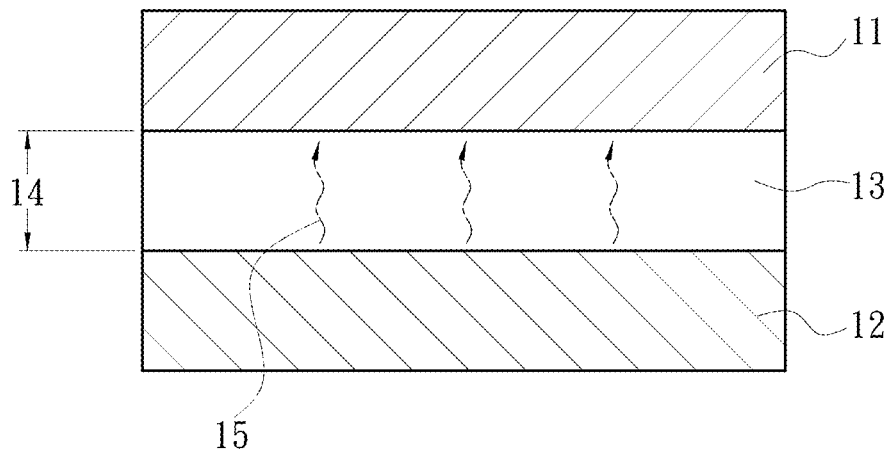
FIG. 7, is a structural schematic diagram of a third embodiment of the invention.
Figure 8:
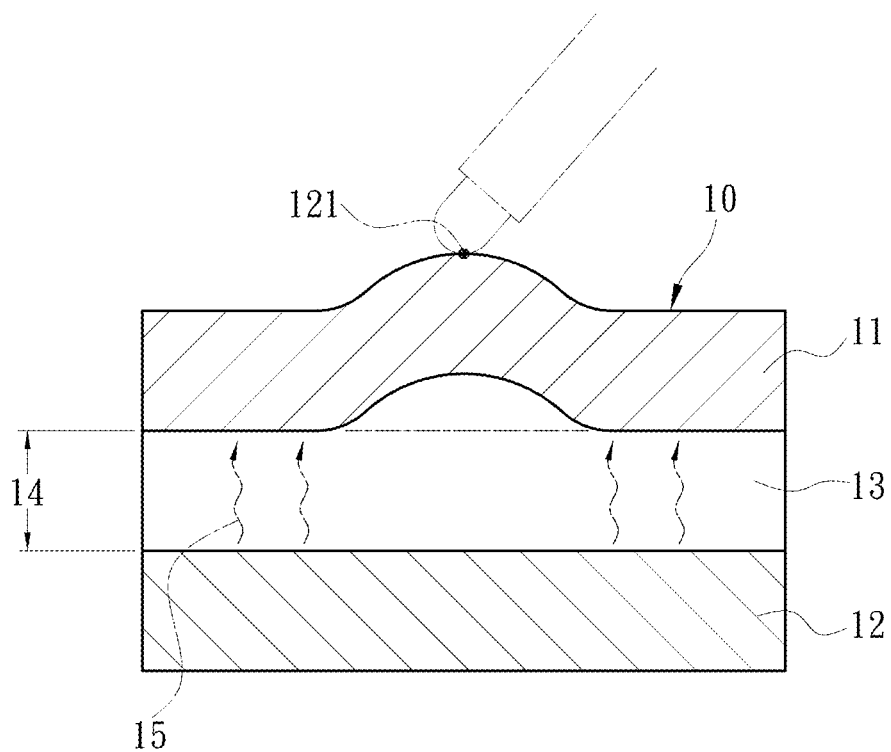
FIG. 8 is a status schematic diagram of the implementation of the third embodiment of the invention.
Figure 9:
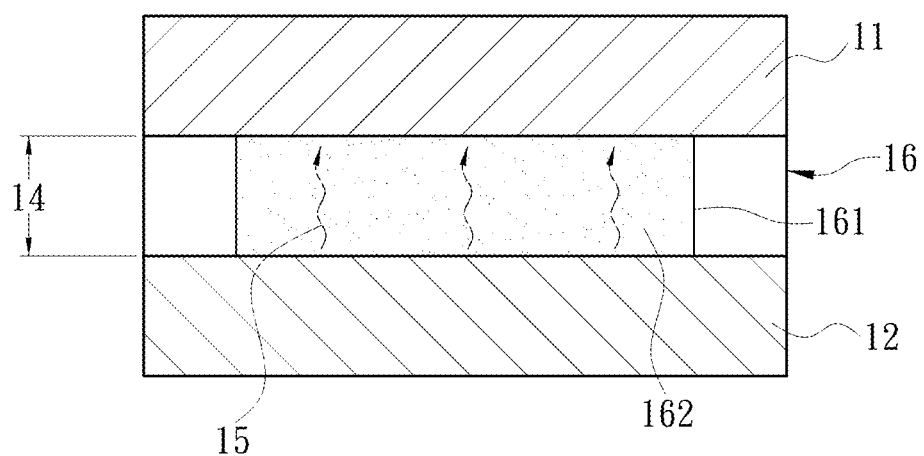
FIG. 9 is a structural schematic diagram of a fourth embodiment of the invention.

According to the foregoing description, the touch sensor 10 detects a touch by the generation of the tunneling current 15; and based on the same technical concept, the touch sensor 10 is also able to detect a touch by no tunneling current 15 is generated. Please refer to FIG. 7, FIG. 8, and FIG. 9, in one embodiment, the touch sensor 10 includes the first electrode 11, the second electrode 12, and the insulator 13. The first electrode 11 is disposed corresponding to the second electrode 12 without contacting the second electrode 12. The first electrode 11 and the second electrode 12 is disposed in a horizontal or non-horizontal manner. At least one of the first electrode 11 and the second electrode 12 is energized, and the energy transmission distance 14 is generated between the first electrode 11 and the second electrode 12. As mentioned above, when the distance between the first electrode 11 and the second electrode 12 is less than the energy transmission distance 14, energy transmission will occur between the first electrode 11 and the second electrode 12 with the tunneling current 15. However, in the embodiment, the distance between the first electrode 11 and the second electrode 12 is shorter than the energy transmission distance 14 when the touch sensor 10 is assembled, that is, the touch sensor 10 generates the electrical signal when it is not touched. In the embodiment, at least one of the first electrode 11 and the second electrode 12 is used as the stressed electrode, and when either one of the first electrode 11 and the second electrode 12 is not stressed, the touch sensor 10 is in a steady state to generate the electrical signal. That is, the touch sensor 10 in this embodiment does not detect the touch based on the generation of the electrical signal, but the steady state that generating the electrical signal is considered to be untouched. Furthermore, a pulling force is applied by the touch operator in this embodiment, which is different from that in the previous embodiment. For example, the touch operator is an object having a suction force. While the touch operator applies a force to the stressed electrode, the suction force is regarded as the pulling force to the stressed electrode, and the stressed point 121 is gradually displaced opposite to the other direction, that is, the distance between two electrodes becomes larger. When the stressed electrode continuously bears the pulling force, the distance between the stressed point 121 and the other electrode is larger than the energy transmission distance 14 to stop the generation of the tunneling current 15. Thus, the electrical signal generated by the touch sensor 10 is changed, and the touch sensor 10 is able to detect a touch through the change of the electrical signal.

As a result, the touch sensor 10 of the invention no longer limits a touch controller to be a conductor or a non-conductor. Beside, since the tunneling current 15 is generated by a certain distance between the electrodes is reached, the magnitude of the tunneling current 15 is more related to the force applied by the touch controller, so that the touch sensor 10 is allowed to detect more specifically. Moreover, the operational accuracy and sensitivity of the touch sensor 10 of the invention are also superior to those of conventional touch sensors implemented in resistive or capacitive configurations. Furthermore, in one embodiment, the touch sensor 10 of the invention is implemented in conjunction with a display structure. The display structure comprises an independent substrate, or in other embodiment, the first electrode 11 or the second electrode 12 is regarded as the substrate required for the display structure, and provided for the display structure to be stacked thereon.

Figure 10:
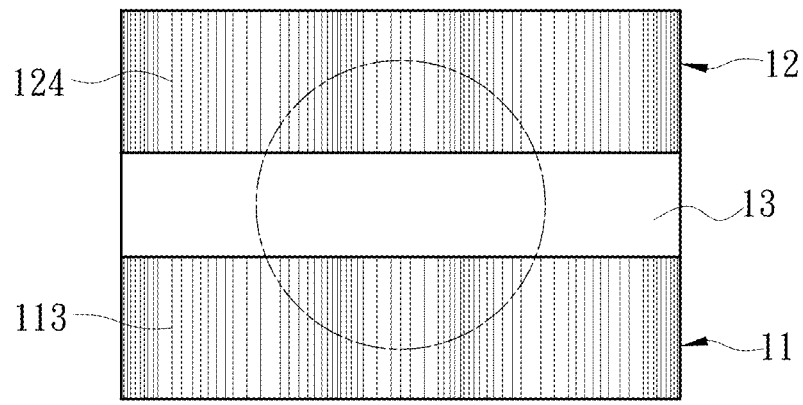
FIG. 10 is a structural schematic diagram of a fifth embodiment of the invention.
Figure 11:
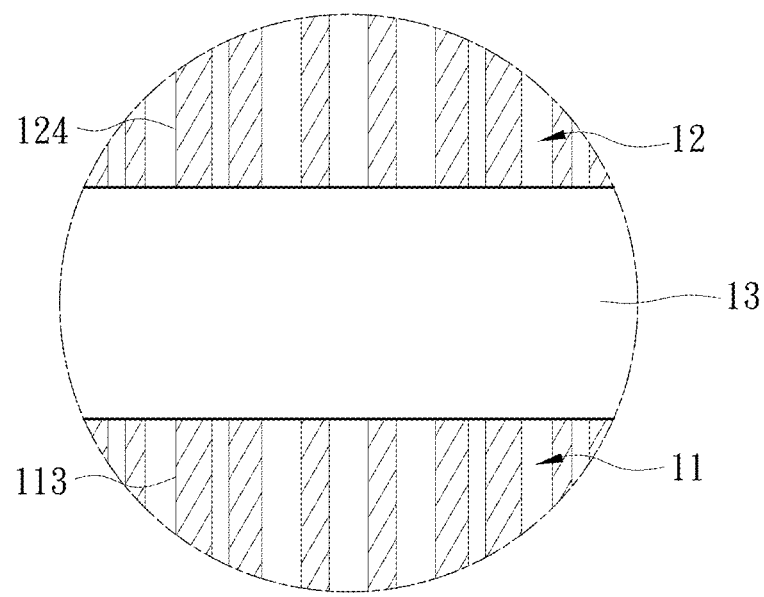
FIG. 11 is a partially enlarged schematic diagram of the fifth embodiment of the invention.
Figure 12:
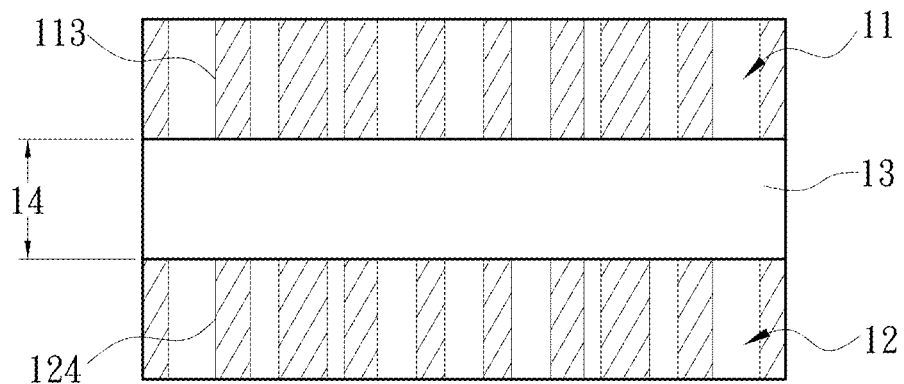
FIG. 12 is a structural schematic diagram of a sixth embodiment of the invention.
Figure 13:
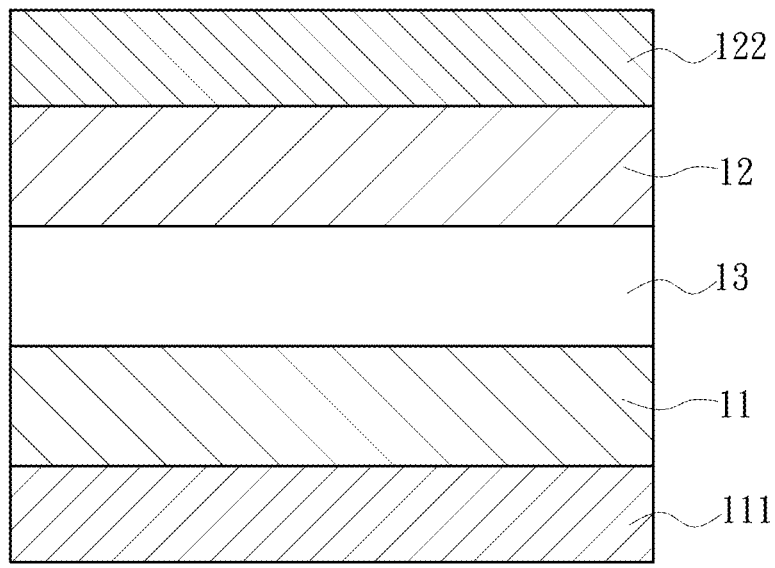
FIG. 13 is a structural schematic diagram of a seventh embodiment of the invention.

Referring to FIG. 10, FIG. 11, and FIG. 12, in order to enhance the ability of the invention to sense the electrical signal, the first electrode 11 and the second electrode 12 are respectively provided with a plurality of conductive lines 113, 124 in a high density, the conductive lines 113,124 are respectively randomly arranged in the first electrode 11 and the second electrode 12 in vertical, and one end of each conductive line 113 (124) faces the insulator 13. In one embodiment, the conductive lines 113,124 are the nano-silver lines, respectively.

Figure 14:
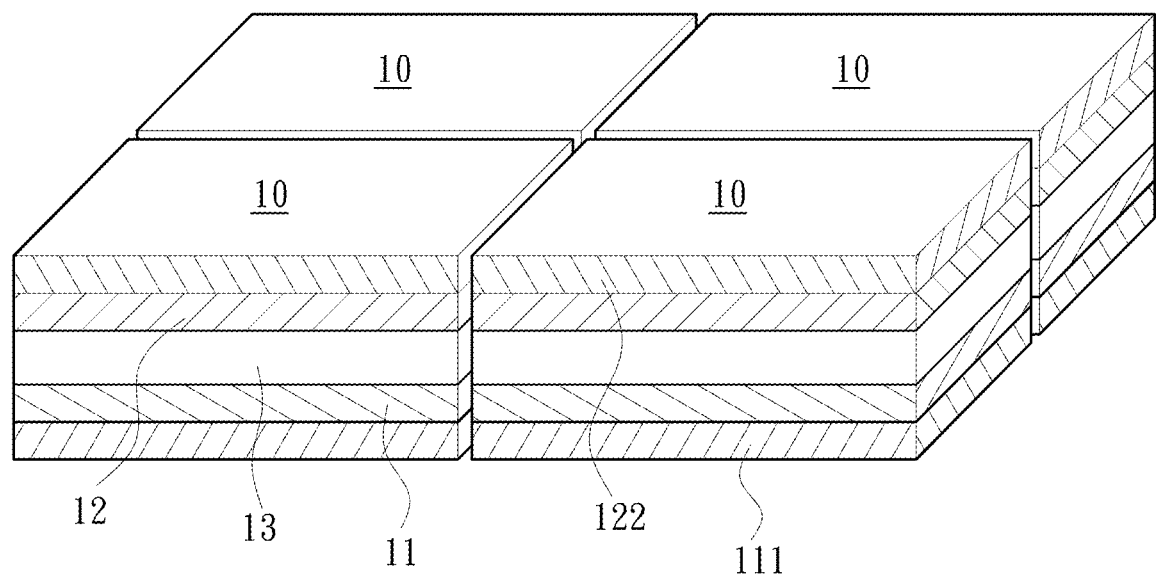
FIG. 14 is a structural schematic diagram of a plurality of arrangements of the seventh embodiment of the invention.
Figure 15:
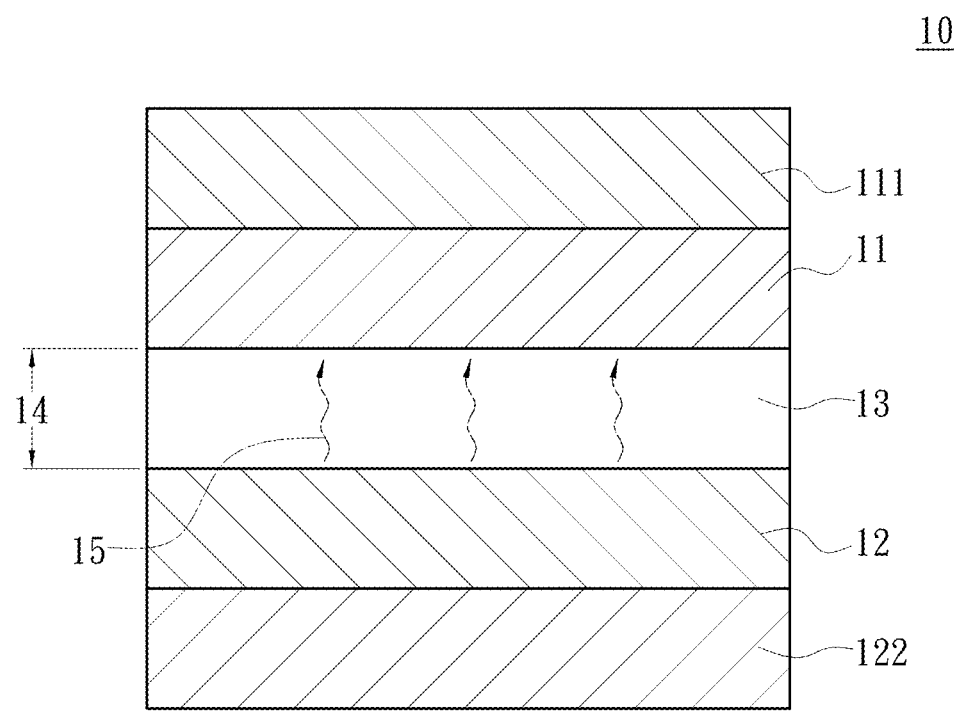
FIG. 15 is a structural schematic diagram of an eighth embodiment of the invention.

Referring to FIG. 13, FIG. 14, FIG. 15, FIG. 16, FIG. 17, FIG. 18, FIG. 19, FIG. 20, and FIG. 21, in one embodiment, the touch sensor 10 further includes a first substrate 111 disposed on a side of the first electrode 11 opposite to the insulator 13 and a second substrate 122 disposed on a side of the second electrode 12 opposite to the insulator 13. Referring to FIG. 14, in the embodiment, the touch sensor 10 is not limited to be implemented independently; however, the touch sensor 10 is implemented by plural as the touch module described above.

Figure 16:
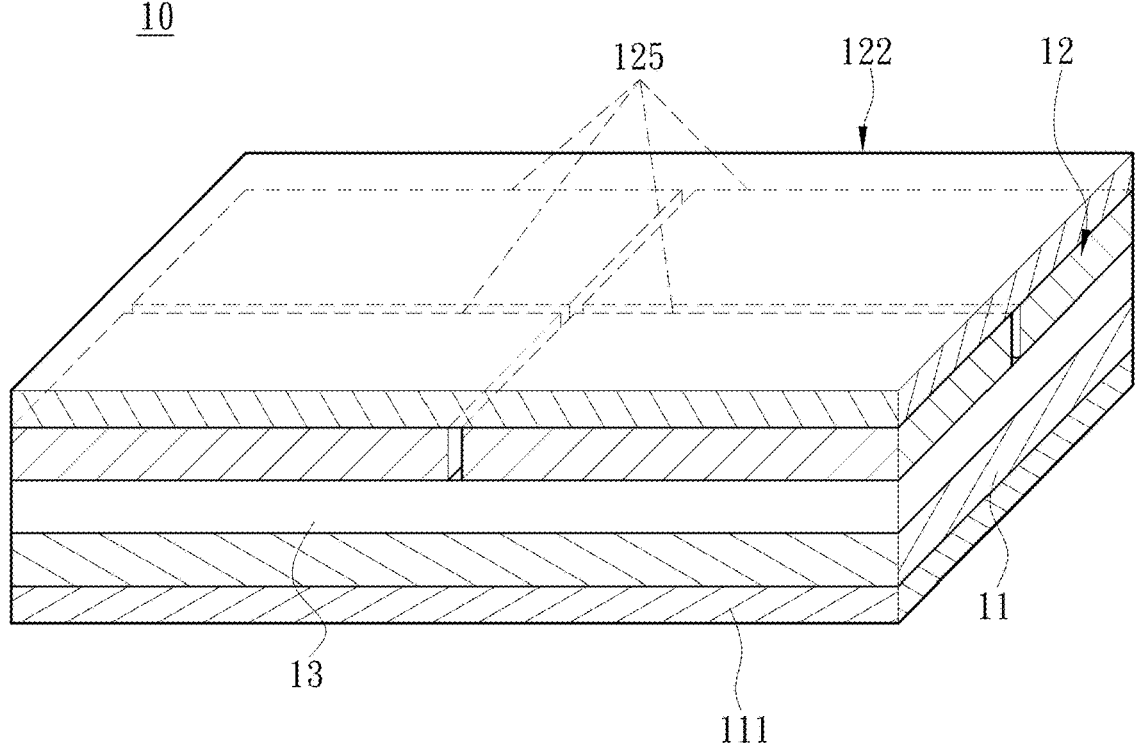
FIG. 16 is a structural schematic diagram of a ninth embodiment of the invention.
Figure 17:
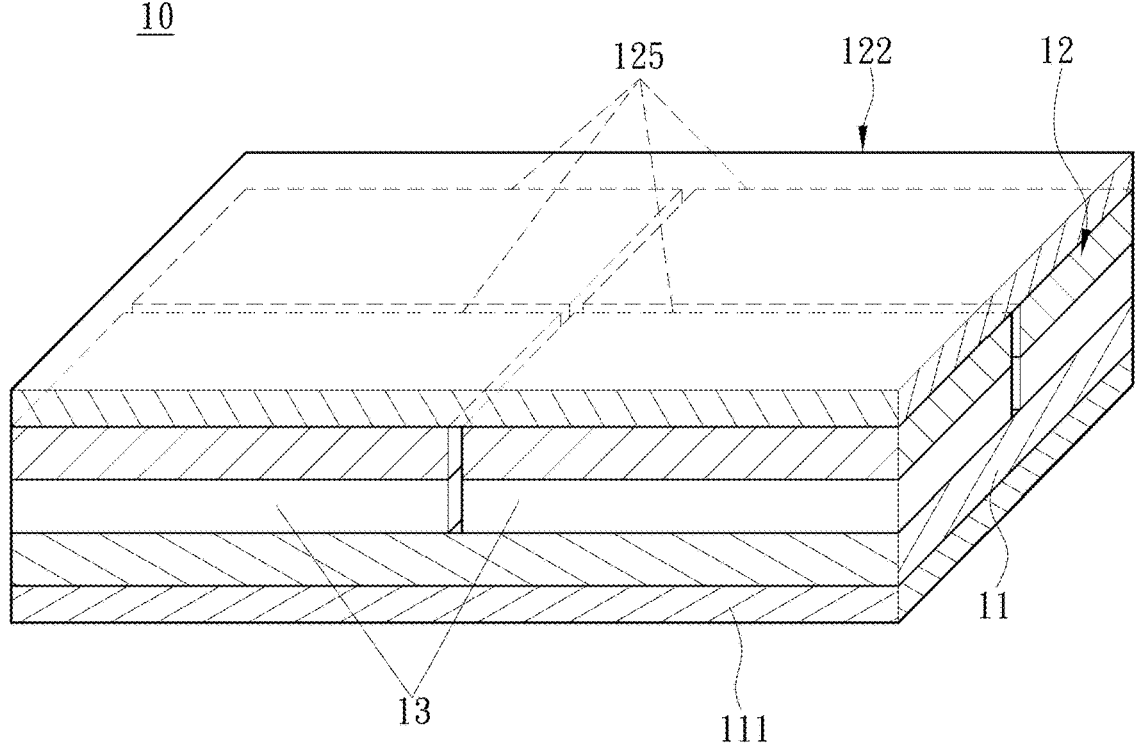
FIG. 17 is a structural schematic diagram of a tenth embodiment of the invention.
Figure 18:
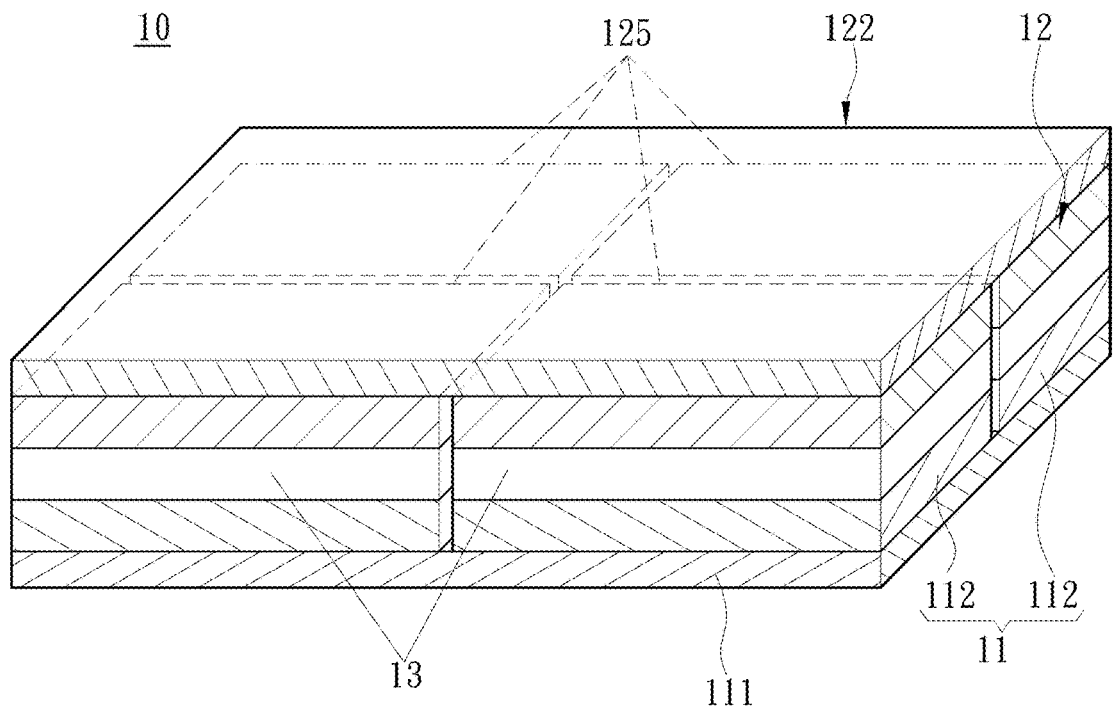
FIG. 18 is a structural schematic diagram of an eleventh embodiment of the invention.

Accordingly, in one embodiment, the first substrate 111 and the second substrate 122 are implemented as non-conductors, and once a touch controller contacts the second substrate 122 (or the first substrate 111), the overall capacitance value of the touch sensor 10 is changed, thereby determining whether the touch controller is a conductor or a non-conductor. Thus, in one embodiment, the second electrode 12 is implemented as a plurality of sub-cells, i.e., the second electrode 12 comprises a plurality of second sub-electrodes 125 spaced apart on the second substrate 122, wherein the plurality of second sub-electrodes 125 share the same second substrate 122, as shown in FIG. 16. Also, referring to FIG. 17, in the embodiment, in addition to second electrode 12 being implemented by the second sub-electrodes 125, the insulator 13 also comprises a plurality of sub-units, and the sub-units of the insulator 13 are spaced apart from each other while the insulator 13 is implemented as a tangible object. When the insulators 13 are gas, a plurality of hermetic spaces 161 are defined by the structure of the touch sensor 10, and the plurality of hermetic spaces 161 are not communicated with each other. Further, referring to FIG. 18, the first electrode 11 also comprises a plurality of first sub-electrodes 112, which are arranged on the first substrate 111. The plurality of first sub-electrodes 112 are spaced apart from each other and share the same first substrate 111. Therefore, the touch sensor 10 is able to detect the position of the stressed point 121 more specifically.

Figure 19:
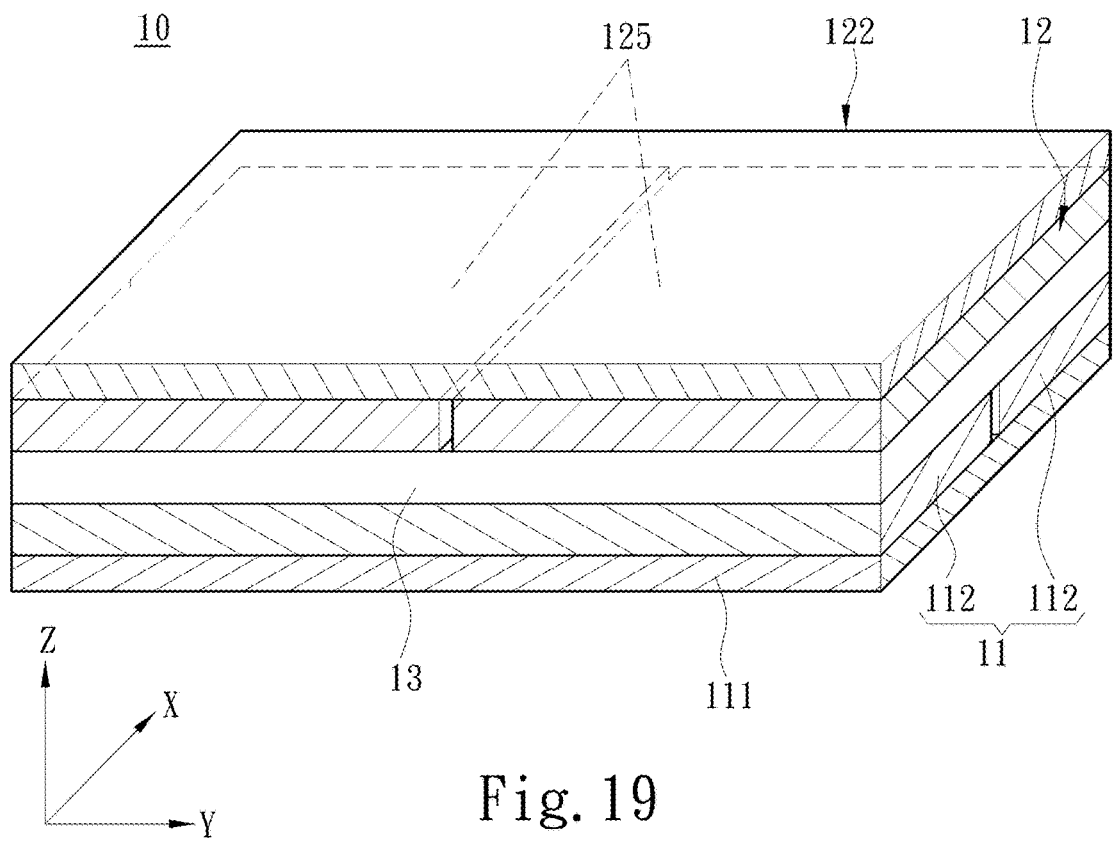
FIG. 19 is a structural schematic diagram of a twelfth embodiment of the invention.

Furthermore, the plurality of first sub-electrodes 112 and the plurality of second sub-electrodes 125 described herein are not limited to block-shape, but in one embodiment, the plurality of first sub-electrodes 112 and the plurality of second sub-electrodes 125 are formed in strips, as shown in FIG. 19. The extending direction of the plurality of first sub-electrodes 112 and the extending direction of the plurality of second sub-electrodes 125 are perpendicular to each other. Referring to FIG. 19, the plurality of first sub-electrodes 112 are arranged parallel to the X-axis direction, and the plurality of second sub-electrodes 125 are arranged parallel to the Y-axis direction. The signal changes in the Y-axis direction and the X-axis direction are detected by the plurality of first sub-electrodes 112 and the plurality of second sub-electrodes 125 in different directions. In addition, according to the embodiment, the signal change in the Z-axis direction is defined as the relative signal change between the first substrate 111 with the second substrate 122.

Figure 20:
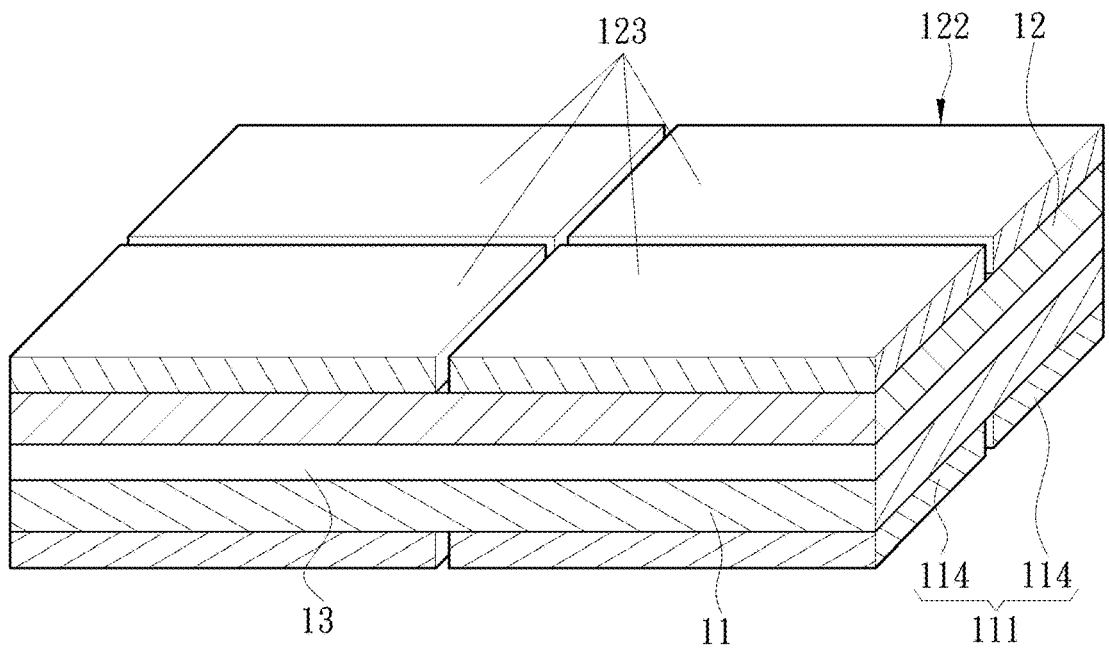
FIG. 20 is a structural schematic diagram of a thirteenth embodiment of the invention.
Figure 21:
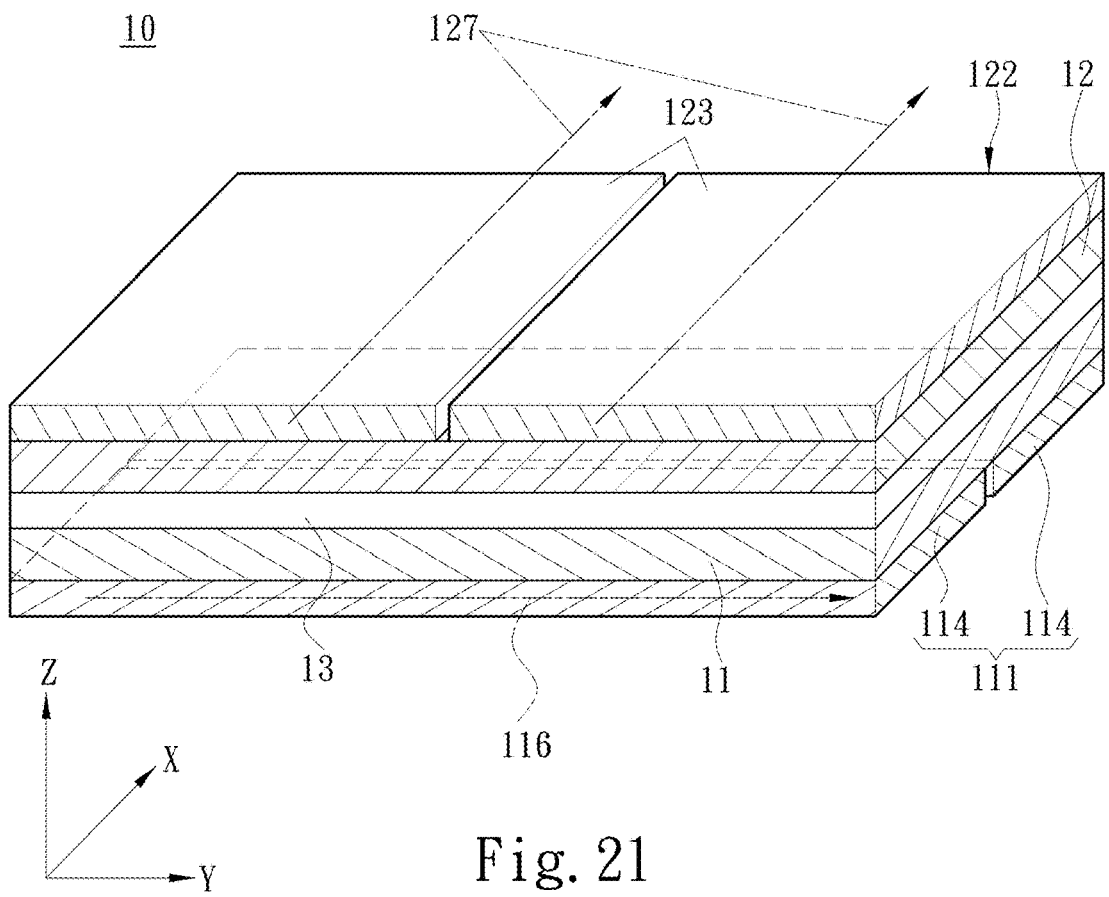
FIG. 21 is a structural schematic diagram of a fourteenth embodiment of the invention.

In addition, referring to FIG. 20 and FIG. 21, in one embodiment, when the two substrates of the touch sensor 10 are implemented as non-conductors or conductors, the first substrate 111 comprises a plurality of first sub-substrates 114 which are arranged on the first electrode 11 and spaced apart from each other, and the plurality of first sub-substrates 114 share the same first electrode 11. On the other hand, the second substrate 122 also comprises a plurality of second sub-substrates 123 which are arranged on the second electrode 12 and spaced apart from each other, and the plurality of second sub-substrates 123 share the same second electrode 12.

Furthermore, the plurality of first sub-substrate 114 and the plurality of second sub-substrate 123 described herein are not limited to block-shape, but in one embodiment, the plurality of first sub-substrate 114 and the plurality of second sub-substrate 123 are formed in strips, as shown in FIG. 21. Further, each of the plurality of first sub-substrates 114 has a first extending direction 116, and each of the plurality of second sub-substrates 123 has a second extending direction 127 perpendicular to the first extending direction 116. Therefore, the signal changes in the Y-axis direction and the X-axis direction are detected by the plurality of first sub-substrates 114 and the plurality of second sub-substrates 123 with different directions. In addition, the signal change in the Z-axis direction is defined as the relative signal change between the first electrode 11 with the second electrode 12.

What is claimed is:

1. A touch sensor, including:
   a first electrode;
   a second electrode, spaced apart from the first electrode, wherein at least one of the first electrode and the second electrode is energized, and an energy difference is existed between the first electrode and the second electrode; and
   an insulator, arranged between the first electrode and the second electrode;
   wherein at least one of the first electrode and the second electrode is a stressed electrode, when the stressed electrode is not stressed, no electrical signal is generated by the touch sensor; when the stressed electrode is stressed to deform at a stressed point, a distance between the stressed point and the other electrode is changed, the stressed electrode is not in contact with the other electrode; when the distance between the first electrode and the second electrode is shortened to an energy transmission distance, a tunneling current is generated between the first electrode and the second electrode, and the electrical signal is generated by the touch sensor, and
   wherein a plurality of conductive lines are respectively arranged in the first electrode and the second electrode in vertical and in high density, and one end of each conductive line faces the insulator.

2. The touch sensor as claimed in claim 1, wherein the insulator is a gas or a tangible object.

3. The touch sensor as claimed in claim 1, wherein the insulator is a gas, the touch sensor comprises a spacer arranged between the first electrode and the second electrode, and at least one gas hole for accommodating the gas is arranged on the spacer.

4. The touch sensor as claimed in claim 3, wherein the touch sensor comprises a first substrate disposed on a side of the first electrode opposite to the insulator and a second substrate disposed on a side of the second electrode opposite to the insulator.

5. The touch sensor of claim 4, wherein the first electrode comprises a plurality of first sub-electrodes, the plurality of first sub-electrodes share the same first substrate, and the second electrode comprises a plurality of second sub-electrodes, the plurality of second sub-electrodes share the same second substrate.

6. The touch sensor of claim 4, wherein the first substrate is comprises a plurality of first sub-substrates, the plurality of first sub-substrates share the same first electrode, and the second substrate comprises a plurality of second sub-substrates, and the plurality of second sub-substrates sharing the same second electrode.

7. The touch sensor of claim 4, wherein the first substrate is comprises a plurality of first sub-substrates arranged in parallel and spaced apart, and the second substrate comprises of a plurality of second sub-substrates arranged in parallel and spaced apart, each of the plurality of first sub-substrates has a first extending direction, and each of the plurality of second sub-substrates has a second extending direction perpendicular to the first extending direction.

8. The touch sensor as claimed in claim 1, wherein the first electrode comprises a plurality of first sub-electrodes which share the same first substrate, and the second electrode comprises a plurality of second sub-electrodes which share the same second substrate.

9. The touch sensor as claimed in claim 1, wherein the first substrate comprises a plurality of first sub-substrates which share the same first electrode, and the second substrate comprises a plurality of second sub-substrates which share the same second electrode.

10. The touch sensor as claimed in claim 1, wherein the first substrate comprises a plurality of first sub-substrates arranged in parallel and spaced apart, and the second substrate comprises a plurality of second sub-substrates arranged in parallel and spaced apart, each of the plurality of first sub-substrates has a first extending direction, and each of the plurality of second sub-substrates has a second extending direction perpendicular to the first extending direction.

* * * * *